US010154515B1

(12) United States Patent
Oroskar et al.

(10) Patent No.: US 10,154,515 B1
(45) Date of Patent: Dec. 11, 2018

(54) DYNAMIC MODULATION AND TRANSPORT BLOCK SIZE SELECTION BASED ON RETRANSMISSION FREQUENCY

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 125 days.

(21) Appl. No.: 15/420,725

(22) Filed: Jan. 31, 2017

(51) Int. Cl.
| | |
|---|---|
| H04L 12/28 | (2006.01) |
| H04W 72/12 | (2009.01) |
| H04L 1/18 | (2006.01) |
| H04L 27/26 | (2006.01) |
| H04J 1/16 | (2006.01) |
| H04W 88/02 | (2009.01) |
| H04W 88/08 | (2009.01) |

(52) U.S. Cl.
CPC ....... *H04W 72/1289* (2013.01); *H04L 1/1812* (2013.01); *H04L 27/2601* (2013.01); *H04W 88/02* (2013.01); *H04W 88/08* (2013.01)

(58) Field of Classification Search
USPC .......................... 370/252, 278, 329
See application file for complete search history.

(56) References Cited

U.S. PATENT DOCUMENTS

| | | | | |
|---|---|---|---|---|
| 2004/0116143 | A1* | 6/2004 | Love | H04L 1/1845 455/522 |
| 2011/0149787 | A1* | 6/2011 | DiGirolamo | H04L 1/0026 370/252 |
| 2017/0332333 | A1* | 11/2017 | Santhanam | H04L 5/14 |

* cited by examiner

*Primary Examiner* — John Pezzlo

(57) ABSTRACT

Disclosed is a method and system for dynamically adjusting modulation and encoding scheme (MCS) and transport block size (TBS) used for downlink transmissions from a base station (BS) to a user equipment device (UE) based on a frequency of retransmission requests from the UE. The BS may identify the UE as belonging to a first class of UEs designated as being capable of receiving data at a first data rate that is higher than a second data rate designated for UEs of a second class, for the same downlink channel quality reported by the UE. Based on the identification, the BS may select a MCS and TBS for the UE corresponding to the first data rate. Upon receiving more than a threshold number of retransmission requests from the UE, the BS may switch to using the second, lower data rate. The first and second classes could correspond to later and earlier technology generations, for example.

20 Claims, 8 Drawing Sheets

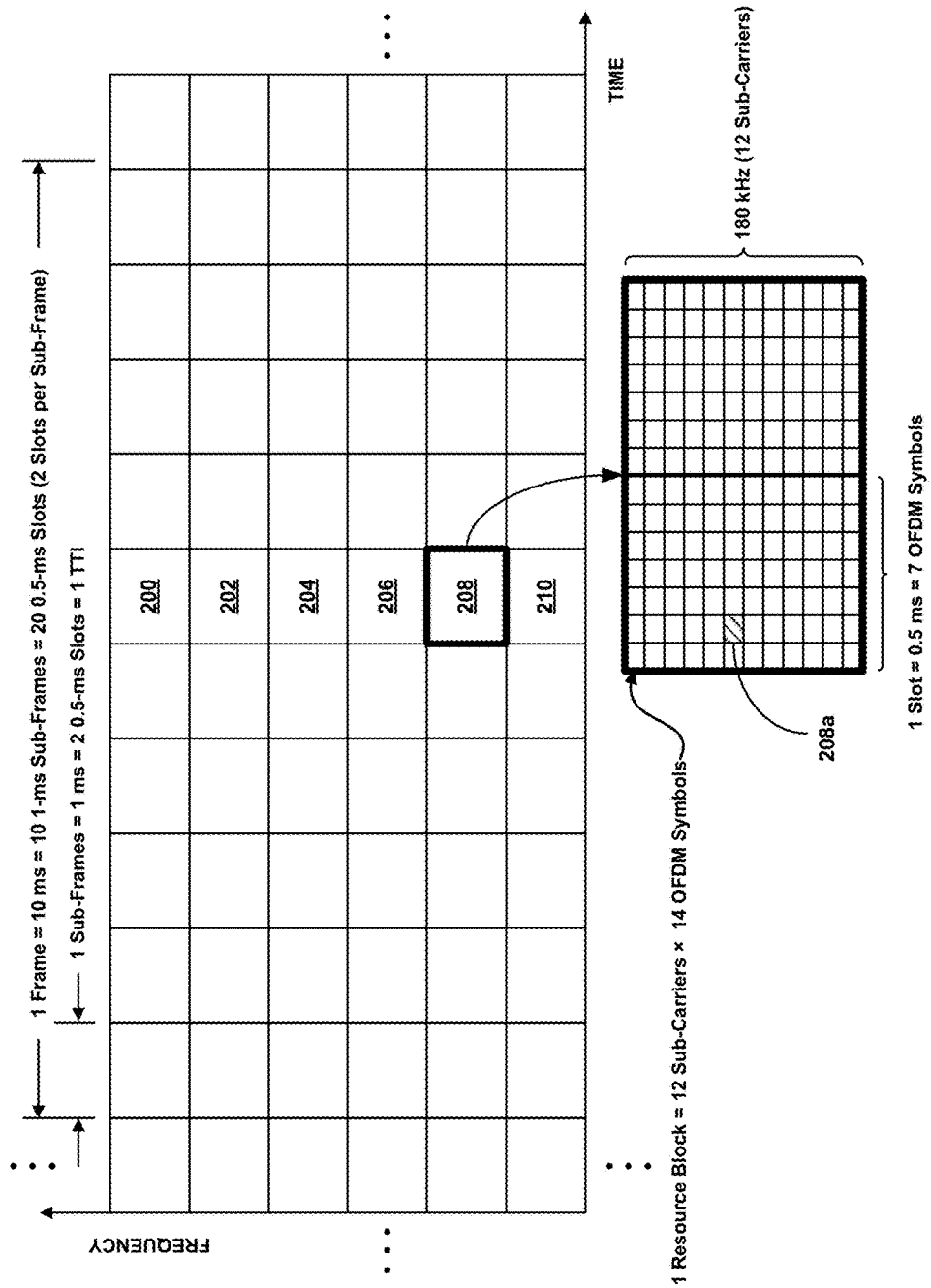

US 10,154,515 B1

DYNAMIC MODULATION AND TRANSPORT BLOCK SIZE SELECTION BASED ON RETRANSMISSION FREQUENCY

BACKGROUND

A typical cellular wireless network includes a number of base stations each radiating to define a respective coverage area, such as a "cell" or "sector" (e.g., a subdivision of a cell), in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Depending on the specific underlying technologies and architecture of a given wireless communication network, base stations may take different forms. In a code division multiple access (CDMA) system configured to operate according IS-2000 and IS-856 standards, for example, a base station may include a base transceiver system (BTS) under the control of a base station controller (BSC). In a universal mobile telecommunications system (UMTS) configured to operate according to ITU IMT-2000 standards, the base station is usually referred to as a NodeB, and is usually under the control of a radio network controller (RNC). In a UMTS network configured to operate to Long Term Evolution (LTE) standards, evolved NodeBs (eNodeBs) may communicate directly with one another, while under functional coordination of a mobility management entity (MME). Other base station architectures and operational configurations are possible as well.

Further, a wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, wireless wide area network (WWAN) protocols such as Orthogonal Frequency Division Multiple Access (OFDMA (e.g., Long Term Evolution (LTE), LTE Advanced and Wireless Interoperability for Microwave Access (WiMAX)), Code Division Multiple Access (CDMA) (e.g., 1×RTT and 1×EV-DO), and Global System for Mobile Communications (GSM), and wireless local area network (WLAN) protocols such as IEEE 802.11 (WIFI), BLUETOOTH, and others. Each protocol may define its own procedures for registration of UEs, initiation of communications, handover or handoff between coverage areas, and other functions related to air interface communication.

In practice, a base station, such as an eNodeB, may be configured to provide service to UEs on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

Each carrier may also define various logical channels to facilitate communication between the base station and one or more served UEs. For instance, on the downlink, a carrier may define a reference channel on which the base station broadcasts a reference signal useable by UEs to detect and evaluate coverage, various other downlink control channels to carry control signaling (such as resource-scheduling directives) to UEs, and one or more shared or traffic channels for carrying bearer data (e.g., user or application level data) to UEs. And on the uplink, a carrier may define one or more uplink control channels to carry control signaling (such as resource scheduling requests, channel state reports, and the like) from UEs, and one or more shared or traffic channels for carrying bearer data from UEs. In practice, the shared or traffic channels may define particular physical resources for carrying data between the base station and UEs.

When a UE enters into a cell or sector (or more generally, coverage area) of a base station, the UE may attach, register, or otherwise associate with the base station, and the base station may then serve the UE on one or more carriers. The base station may then be referred to as the UE's "serving" base station. Herein, the term "serving" will, in general, be used to describe a particular base station as such only when it is not otherwise apparent from context. In practice, the process of serving the UE may involve the serving base station allocating use of particular air interface resources, such as traffic channels or portions thereof, to carry data communications to and from the UE, and managing transmission on those resources, such as controlling what modulation scheme is used for the transmissions.

For instance, when the serving base station has data to transmit to the UE, the serving base station may select certain downlink resources to carry the data and may determine a modulation scheme for transmission on those resources, and the base station may then (i) transmit to the UE a scheduling directive instructing the UE to receive the data on the scheduled resources using the determined modulation scheme, and (ii) transmit the data on the indicated downlink resources using the determined modulation scheme. Likewise, when the serving base station receives from the UE a request for the UE to transmit data to the base station, the base station may select certain uplink resources to carry the data and may determine a modulation scheme for transmission on those resources, and the base station may then (i) transmit to the UE a scheduling directive instructing the UE to transmit the data on the scheduled resources using the determined modulation scheme and (ii) receive the transmission from the UE accordingly.

A UE may also move between neighboring coverage areas of base stations. More specifically, as a UE moves between wireless coverage areas of a wireless communication system, or when network conditions change or for other reasons, the UE may "handover" (or "hand off") from operating in one coverage area (e.g., a serving coverage area) to operating in another coverage area. In a usual case, this handover process is triggered by the UE monitoring the signal strength of various nearby available coverage areas, and the serving base station (or some other controlling network entity) determining when one or more threshold criteria are met. For instance, a UE may continuously monitor signal strength from various available coverage areas and notify its serving base station when a given coverage area has a signal strength that is sufficiently higher than that of the serving base station. The serving base station (or some other controlling network entity) may then direct the UE to handover to the base station of the given coverage area. By convention, a UE is said to handover from a "source" base station (or source coverage area) to a "target" base station (or target coverage area). At the time that a handover is triggered, the source base station is the UE's serving base station.

OVERVIEW

Communications from a base station to a UE are carried on a "forward link" (e.g., in a CDMA system) or "downlink" (e.g., in a UMTS/LTE network) of an air interface between the UE and base station, and communications from a UE to the base station are carried on "reverse link" (e.g., in a CDMA system) or "uplink" (e.g., in a UMTS/LTE network) of the air interface. By way of example, the discussion herein will be made with reference to LTE, and the terms downlink and uplink will therefore be adopted. However, it should be understood that discussion applies as well to forward and reverse links.

Under LTE, for example, downlink transmissions from a base station to a UE may be scheduled across a temporal sequence of data symbol times, and the UE may decode the sequentially-received symbols during a corresponding sequence of symbol decoding times. Downlink and uplink transmissions are made in physical "resource blocks" ("RBs") that span a fixed number of symbol times (typically 14) in time and a fixed number of sub-carriers (typically 12) in frequency. Each RB thus comprises a time-frequency array of "resource elements" (REs), each RE being a transmission of encoded data. The time duration of each RB defines one subframe, and during each subframe, multiple RBs spanning different, distinct groupings of (12) sub-carriers may be transmitted. The number of RBs accommodated during each subframe depends on the frequency bandwidth allocated by a service provider. All of the RBs of a given subframe are transmitted synchronously over a "transmission time interval" ("TTI") that spans the subframe.

The effective data rate corresponding to a given transmission then depends on a number of bits per encoded symbol and a size of a "transport block" specified for the given transmission. The number of bits per symbol is determined by a chosen "modulation and encoding scheme" ("MCS") and the block size is determined by a chosen "transport block size" ("TBS"). Once selected, these two parameters determine a "volume density" and volume of data that will be transmitted to a UE in a given TTI, and hence a data transmission rate. For a transmission on the downlink to a UE, the base station will select the MCS and TBS based on a downlink channel quality measurement made by the UE and reported to the base station in "channel quality indicator" ("CQI") control message. Thus, the base station relies, at least in part, on the UE's reported CQI when determining downlink data rate.

In practice, the base station may maintain one or more look-up tables that specify MCS and TBS values associated with CQI indices. When allocating resources and scheduling transmissions to a UE, the base station may then select MCS and TBS according to the UE's reported CQI. The UE may report CQI on an uplink control channel periodically and/or episodically. For example, a UE may transmit a CQI in each uplink TTI occurring during a time when the UE is actively communicating with its serving base station. The serving base station may in turn select MCS and TBS values from the look-up tables accordingly and possibly varying over the course of the active communications.

As technological advances enhance UE reception and decoding capabilities, various industry standards may be updated from time to time in order to specify how such enhancements may be implemented within existing wireless networks. Under LTE, for example, sequential LTE "release versions" may add to or revise aspects of standards to accommodate technology enhancements of new versions of UEs, while maintaining compatibility with older UE versions. As a specific example, LTE release version 12 ("Rel 12") accommodates enhanced reception and decoding capabilities of newer UEs by adding new versions of the MCS and TBS look-up tables. In particular, the new tables may specify higher downlink data rates—as determined by MCS and TBS—for given reported CQI values than the downlink data rates specified in the original tables for the same given reported CQI values. By maintaining both the original and new tables, LTE Rel 12 thus maintains backward compatibility with older UEs.

In practice, when a base station receives a CQI report from a UE identified as being compliant with LTE Rel 12 (a "Rel 12 UE"), the base station may then use the new tables to determine MCS and TBS, and thereby serve the UE with a higher downlink data rate than it would a pre-Rel 12 UE. (There may be additional criteria for using the new tables; UE compliance with Rel 12 may be considered a necessary condition.) The base station will use the original tables when determining MCS and TBS for a pre-Rel 12 UE.

While use of the new MCS and TBS tables for a Rel 12 UE takes advantage of the Rel 12 UE's enhanced capabilities, there may be circumstances in which the Rel 12 UE would be better served at the lower downlink data rates specified in the original pre-Rel 12 MCS and TBS tables. For example, under LTE (and other wireless systems), retransmission of data that are not successfully received is managed using a hybrid automatic repeat request (HARM) process. The number of retransmissions requested and made in the course of transmitting a unit of data, such as a data packet, may be an indication of air interface conditions on the transmission link. In particular, the larger the number of retransmissions, the lower the quality of the air interface link, and vice versa. Thus, for a Rel 12 UE receiving downlink data transmitted at the higher rate specified in the new MCS and TBS tables, a high frequency of retransmission requests may indicate that operating conditions do not adequately support higher rate, in spite of the Rel 12 UE's reported CQI.

In conventional operation under LTE Rel 12, once a base station determines that it should use the new MCS and TBS tables for a Rel 12 UE, it will do so regardless of the number of retransmission requests it receives from the UE in the course of transmitting a unit of data, such as a data packet. Since a high frequency of retransmission requests may indicate that the downlink quality is not high enough to support the higher data rates, it would be advantageous to be able to modify selection of MCS and TBS to accommodate the evidently insufficient quality of the downlink. Accordingly, example embodiments herein are directed to dynamically adjusting modulation scheme and block size based on retransmission frequency.

Hence, in one respect, various embodiments of the present invention provide a method operable in a base station of a wireless communication network, the method comprising: receiving a message from a user equipment device (UE) reporting a particular channel quality measurement by the UE of an air-interface downlink channel from the base station; making a determination that the UE belongs to a first class of UEs designated as being capable of receiving downlink transmissions at a data rate based on a given reported channel quality measurement that is higher than a data rate for a second class of UEs based on the same given reported channel quality measurement; transmitting a unit of data to the UE on the air-interface downlink channel at a first data rate specified for the first class of UEs in accordance with the reported particular channel quality measurement, wherein the base station is configured to transmit the unit of data in up to N incremental transmissions, each conveying at least a portion of the unit of data; and in response to receiving M retransmission requests from the UE during the transmitting, wherein M<1V, switching to transmitting the unit of data to the UE on the air-interface downlink channel at a lower, second data rate specified for the second class of UEs in accordance with a current channel quality measurement, the current channel quality measurement being one of the reported particular channel quality measurement or a subsequently reported channel quality measurement.

In another respect, various embodiments of the present invention provide a base station of a wireless communication network, the base station comprising: a first transceiver; one or more processors; and memory accessible to the one or more processors, and storing machine language instructions that, upon execution by the one or more processors, cause the base station to carry out operations including: receiving a message from a user equipment device (UE) reporting a particular channel quality measurement by the UE of an air-interface downlink channel from the base station; making a determination that the UE belongs to a first class of UEs designated as being capable of receiving downlink transmissions at a data rate based on a given reported channel quality measurement that is higher than a data rate for a second class of UEs based on the same given reported channel quality measurement; transmitting a unit of data to the UE on the air-interface downlink channel at a first data rate specified for the first class of UEs in accordance with the reported particular channel quality measurement, wherein the base station is configured to transmit the unit of data in up to N incremental transmissions, each conveying at least a portion of the unit of data; and in response to receiving M retransmission requests from the UE during the transmitting, wherein M<N, switching to transmitting the unit of data to the UE on the air-interface downlink channel at a lower, second data rate specified for the second class of UEs in accordance with a current channel quality measurement, the current channel quality measurement being one of the reported particular channel quality measurement or a subsequently reported channel quality measurement.

Further, in still another respect, various embodiments of the present invention provide a non-transitory computer-readable medium having instructions stored there on that, when executed by one or more processors of a base station of a wireless communication network, cause the base station to carry out operations including: receiving a message from a user equipment device (UE) reporting a particular channel quality measurement by the UE of an air-interface downlink channel from the base station; making a determination that the UE belongs to a first class of UEs designated as being capable of receiving downlink transmissions at a data rate based on a given reported channel quality measurement that is higher than a data rate for a second class of UEs based on the same given reported channel quality measurement; transmitting a unit of data to the UE on the air-interface downlink channel at a first data rate specified for the first class of UEs in accordance with the reported particular channel quality measurement, wherein the base station is configured to transmit the unit of data in up to N incremental transmissions, each conveying at least a portion of the unit of data; and in response to receiving M retransmission requests from the UE during the transmitting, wherein M<1V, switching to transmitting the unit of data to the UE on the air-interface downlink channel at a lower, second data rate specified for the second class of UEs in accordance with a current channel quality measurement, the current channel quality measurement being one of the reported particular channel quality measurement or a subsequently reported channel quality measurement.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 2A is a conceptual illustration of a division of a shared communication link into resource blocks, in accordance with example embodiments.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
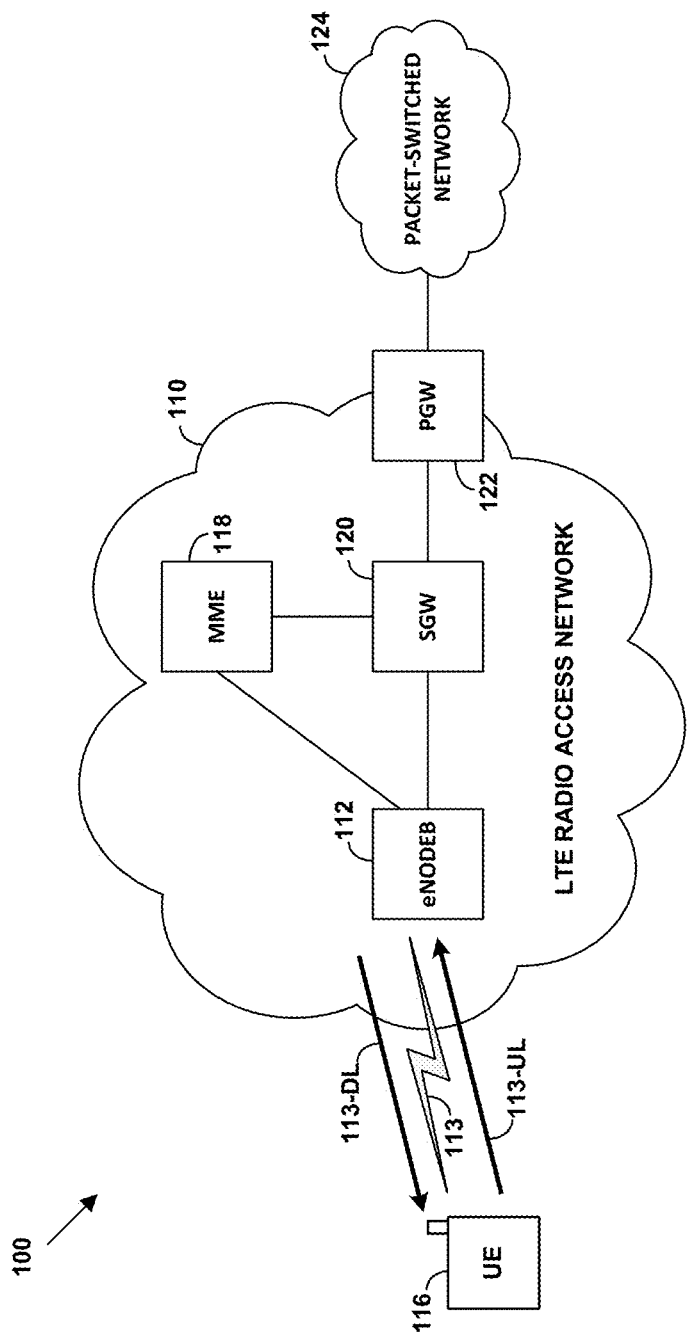
FIG. 1 is a simplified block diagram of a wireless communication network in which an example method can be implemented, in accordance with example embodiments.

Referring to the drawings, FIG. 1 is a simplified block diagram of a wireless communication system or network 100 in which an example of the present method can be implemented. In particular, FIG. 1 includes by way of example a representative LTE radio access network (RAN) 110 including an example LTE base station known as an eNodeB 112, which radiates to provide a wireless coverage area defining an LTE air interface 113 through which the eNodeB may serve one or more UEs. As shown, the air interface 113 supports downlink communications from the eNodeB 112 to the UE 116 on an air interface downlink 113-DL, and supports uplink communications from the UE 116 to the eNodeB 112 on an air interface uplink 113-UL.

The eNodeB 112 is then shown coupled with core LTE network infrastructure, which may include a mobility management entity (MME) 118, a serving gateway (SGW) 120 and a packet-data network gateway (PGW) 122 providing connectivity with a packet-switched network 124 such as the Internet. Shown within coverage of the eNodeB 112 is then a representative UE 116. In practice, the LTE access network may be operated by a cellular wireless service provider, and the UE may subscribe to service of that provider.

In general, a wireless service provider may operate one or more RANs, such as the LTE RAN 110, as a "public land mobile network" ("PLMN") for serving UEs (or other mobile terminals) that subscribe to service of the provider. For example, a service provider may operate an LTE RAN as an LTE PLMN and may provide UEs with subscriptions that allow the terminals to receive LTE service from that PLMN. As another example, a service provider may operate a CDMA RAN as a CDMA PLMN and may provide UEs with subscriptions that allow the terminals to receive CDMA service from that PLMN. And as another example, a service provider may operate both an LTE PLMN and a CDMA PLMN and may provide UEs with subscriptions that allow the UEs to receive both LTE service from the LTE PLMN and CDMA service from the CDMA PLMN.

In practice, a RAN operating as a PLMN may have an associated PLMN identifier (PLMN ID), and base stations of the RAN may be arranged to broadcast that PLMN ID to indicate that the base stations are part of that PLMN. UEs that subscribe to service of a wireless service provider's PLMN may then be provisioned with data indicating the PLMN ID of the PLMN and with logic that causes the UEs to prefer service by base stations broadcasting that PLMN ID. Further, UEs that subscribe to service of multiple PLMNs, such as both an LTE PLMN and a CDMA PLMN may be provisioned with data indicating the PLMN IDs of each such PLMN and with logic that causes the UEs to prefer service by base stations broadcasting one or more of those PLMN IDs.

A wireless service provider may also allow one or more of its PLMNs to serve UEs that subscribe to service of other PLMNs, pursuant to a roaming agreement. In particular, a first wireless service provider providing a first PLMN may enter into a roaming agreement with a second wireless service provider providing a second PLMN, according to which the first PLMN will serve UEs that subscribe to the second PLMN, and the second wireless service provider will compensate the first service provider for providing that service. As such, a given UE that subscribes to service of the second PLMN but that is not within sufficient coverage of the second PLMN may instead opt to be served by the first PLMN, in which case the given UE is said to be "roaming" in the first PLMN. The second wireless service provider may also provide reciprocal roaming service to UEs that subscribe to service of the first PLMN.

Under LTE, each coverage area of a base station, such as the eNodeB 112, may operate on one or more RF carriers (or carrier bands) of electromagnetic spectrum. More specifically, carrier bands are allocated to service providers in different RF ranges and in non-overlapping bands of 1.4 MHz, 3 MHz, 5 MHz, 10 MHz, 15 MHz, and/or 20 MHz. Some service providers may have more than one carrier band allocation. Contiguous groupings of carriers can be further organized in frequency within different specified "band channels" used to sub-divide the RF spectrum at a higher level than individual carrier bands.

Any given carrier (or carrier band) can be characterized by a minimum frequency and a maximum frequency, such that the carrier bandwidth is just the difference between the maximum and minimum frequencies. The maximum and minimum frequencies can also be considered as defining band "edges." The carrier bandwidth is sub-divided into K "sub-carriers," each 15 kHz wide, and sub-carriers are arranged in contiguous, non-overlapping groupings of 12 each to make up a frequency dimension of N 180-kHz-wide "resource blocks" of the carrier band, as described in more detail below. The number N depends on the carrier bandwidth. In practice, the total bandwidth of any given LTE carrier is somewhat wider than the N×180 kHz of its N resource blocks. For example, a 20 MHz carrier band has N=100 resource blocks for a total utilized bandwidth of 18 MHz out of the 20 MHz available. As another example, a 10 MHz carrier band has N=50 resource blocks for a total utilized bandwidth of 9 MHz out of the 10 MHz available. Under LTE, the unutilized bandwidth—i.e., bandwidth of sub-carriers that are not included in any of the N resource blocks—is configured in two guard bands, one at each band edge. That is, one guard band occupies spectrum between the first resource block and a first band edge, and the other guard band occupies spectrum between the last resource block and the second band edge.

On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

Under LTE, downlink and uplink air interface resources are mapped in the time domain and in the frequency domain. In the time domain, the air interface may be divided into a continuum of 10 millisecond (ms) frames, with each frame being further divided into ten 1-ms subframes that are in turn each divided into two 0.5-ms slots. Thus, each frame has 10 subframes, and each subframe has 2 slots; the 1-ms duration of a subframe also defines a transmission time interval (TTI). Slots are each further sub-divided into a number (typically 7) of modulation intervals, or "symbol times." In the frequency domain, data for transmission during each symbol time are jointly modulated over a sequence of the K sub-carriers that span the bandwidth of the carrier, using orthogonal frequency division multiplexing (OFDM) to form one OFDM symbol per symbol time. Each OFDM symbol thus corresponds to a frequency superposition of modulated data symbols, which are further organized in frequency into groups, each group spanning 12 contiguous sub-carriers. As noted, each sub-carrier is 15 kHz wide, so each group of 12 sub-carriers occupies a 180 kHz bandwidth.

The term "symbol" herein may be used to refer to different types of entities, depending on how the term is modified, the context in which it used, or both. To help maintain clarity in the discussion, the following definitions are provided. The term "modulated data symbol" refers to data presented for transmission and/or recovered by processing following reception. An example is 6 bits modulated according to 64QAM and presented to an OFDM transmitter. The term "OFDM symbol" refers to a transmitted or received unit of data that is made up of a frequency superposition of multiple modulated data symbols, as described above. The term "data symbol" without any modifier generally refers herein to a unit of data that is transmitted across and/or received on one or more sub-carrier frequencies. As such an "OFDM symbol" may be considered a specific type or case of "data symbol."

LTE further defines a particular grouping of resources arrayed across one subframe (1 ms) in the time-domain and 12 sub-carriers in the frequency-domain as a resource block, as noted above. Typically, the 1-ms duration of a resource block contains 14 symbol times accommodating 14 OFDM symbols, each a frequency superposition of modulated data symbols spanning 66.7 microseconds (μs) plus a 4.69 μs guard band (cyclic prefix) added to help avoid inter-symbol interference. In practice, the cyclic prefix is commonly considered part of an OFDM symbol, so that the term "OFDM symbol" is taken to refer to the jointly-modulated data symbols plus the pre-pended cyclic prefix. Thus, each resource block contains 14 OFDM symbols by 12 sub-carriers, thereby constituting an array of 168 "resource elements." The air interface may thus support transmission of N resource blocks in each subframe. For instance, a 5 MHz carrier supports N=25 resource blocks in each 1-ms subframe, whereas a 20 MHz carrier supports N=100 resource blocks in each 1-ms subframe. Note that a resource block is sometimes alternatively defined as 7 OFDM symbols of a 0.5 ms slot by 12 sub-carriers in the frequency-domain. Unless stated otherwise, however, a resource block will be taken herein to be 14 OFDM symbols in the time domain (a 1-ms subframe).

A resource element is to the smallest unit of resource allocated on the LTE air interface. Each resource element corresponds to one modulated data symbol on one sub-carrier during one symbol time. As noted, a resource block that consists of 12 sub-carriers and 14 OFDM symbols has 168 resource elements. Each modulated data symbol, and thus each resource element, can represent a number of bits, with the number of bits depending on the modulation scheme used. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits. The frequency superposition of all modulation symbols during a given symbol time and across all sub-carriers of a given carrier band (plus a cyclic prefix) thus corresponds to one OFDM symbol.

On transmission, during each TTI (1-ms subframe), the N resource blocks of a carrier band are transmitted synchronously as a time sequence of 14 OFDM symbols, each spanning all the sub-carriers of the carrier band. Unused resources—e.g., resource elements and/or resource blocks for which there are no data to transmit, and/or sub-carriers in the guard bands at the carrier edges—may be included "virtually" in the frequency superposition at zero power. The frequency superposition of modulated data symbols is computed as a Fourier superposition. For purposes of the discussion herein, the Fourier superposition may be considered a form of encoding.

In practice, the computation is carried out using well-known fast Fourier transform (FFT) techniques implemented as machine language instructions (e.g., software, firmware, and/or hardware instructions) stored in one or another form of memory and executed by one or more processors. For transmission, an inverse FFT (IFFT) is applied synchronously to all modulated data symbols to be transmitted during each OFDM symbol time, thereby effectively encoding them simultaneously. The process is repeated continuously for each of the modulated data symbols in each subsequent OFDM symbol time. Every sequence of 14 OFDM symbols, time-aligned within a TTI and transmitted on the K sub-carriers of a carrier band, corresponds to N transmitted resource blocks over the TTI duration.

On reception, the N resource blocks are received during each TTI as a time sequence of the 14 transmitted OFDM symbols. An FFT is applied synchronously to each OFDM symbol as it is received in order to decompose the frequency superposition and to recover the modulated data symbols. For purposes of the discussion herein, the Fourier decomposition may be considered a form of decoding. The modulated data symbols of all N resource blocks are thereby recovered, and individual resource blocks can be obtained according to the respective 12-sub-carrier groupings that define the frequency dimensions of each resource block. If the receiver is a UE, after decoding, it will only be able to obtain those resource blocks allocated to it on the downlink.

Within a resource block, different resource elements can serve different functions. For instance, on the downlink, certain resource elements across the bandwidth may be reserved to define the PDCCH for carrying control signals such as page messages and resource allocations from the eNodeB to UEs, and other resource elements may be reserved to define the PDSCH that the eNodeB can allocate to carry transmissions to particular UEs on an as-needed basis. Likewise, on the uplink, certain resource elements across the bandwidth may be reserved to define the PUCCH for carrying control signals such as scheduling requests from UEs to the eNodeB, and other resource elements may be reserved to define the PUSCH that the eNodeB can allocate to carry transmissions from particular UEs on an as-needed basis.

In practice, the PUCCH may define various periodically occurring "scheduling request opportunities" in which a UE, such as UE 116, may transmit scheduling requests to an eNodeB, such as the eNodeB 112. For instance, each scheduling request opportunity for the UE may be a particular resource element on the PUCCH, occurring every fourth transmission TTI (i.e., every 4 ms) or the like. Optimally, the eNodeB would signal to the UE to inform the UE which scheduling request opportunities are for the UE. Thus, the UE can transmit a scheduling request to the eNodeB by simply transmitting a 1-bit or other predefined bit in one of its scheduling opportunities, and the eNodeB may thus monitor the PUCCH for such a scheduling request from the UE.

Upon receipt of scheduling request from the UE, the eNodeB may then schedule uplink transmission by the UE. In particular, the eNodeB may generate and transmit to the UE on the PDCCH "downlink control information" (DCI) that specifies scheduling information in a manner sufficient to inform the UE what resources on the PUSCH the UE should use for transmitting data to the eNodeB. For instance, the DCI may designate particular resource blocks in which the UE may transmit on the PUSCH. In practice, this allocation may be for a TTI that is some predefined time period after the TTI in which the UE sent the scheduling request, such as a TTI that is 4 milliseconds later. Thus, if the UE sends a scheduling request in a particular TTI, then the resource allocation that the UE receives in response to that request may be for resources in a TTI that occurs 4 milliseconds later.

FIG. 2A illustrates how the resources in a given wireless coverage area may be divided in time and frequency domains into resource blocks under LTE. In the time domain, each resource block occupies a 1-ms subframe. By way of example, FIG. 2A shows resource blocks 200-210 for a portion of a subframe. In the frequency domain, each of the resource blocks 200-210 occupies a respective portion of frequency bandwidth, typically 180 kHz. For purposes of illustration, FIG. 2A shows resource blocks across just six subframes in time and six 12-sub-carrier groupings in frequency. However, as noted above, each LTE frame typically has 10 subframes, while the number of resource blocks spanning frequency depends on the bandwidth of the carrier. For instance, in a 5 MHz LTE carrier, a total of 25 resource blocks may span frequency during each 1 ms subframe. Horizontal and vertical ellipses in the figure represent additional resource blocks in the time and frequency dimensions.

FIG. 2A also includes a more detailed view of resource block 208, illustrating resource elements arrayed in time and frequency. This detailed view shows that the 180 kHz of frequency bandwidth corresponds to 12 sub-carriers of 15 kHz each, and also shows that the 1 ms subframe corresponds to the duration of 14 OFDM symbols (although a different number of OFDM symbols per resource block can be used). As noted above, each resource element corresponds to a modulated sub-carrier symbol that is carried on a particular sub-carrier for the duration of one symbol time.

Figure 2B:
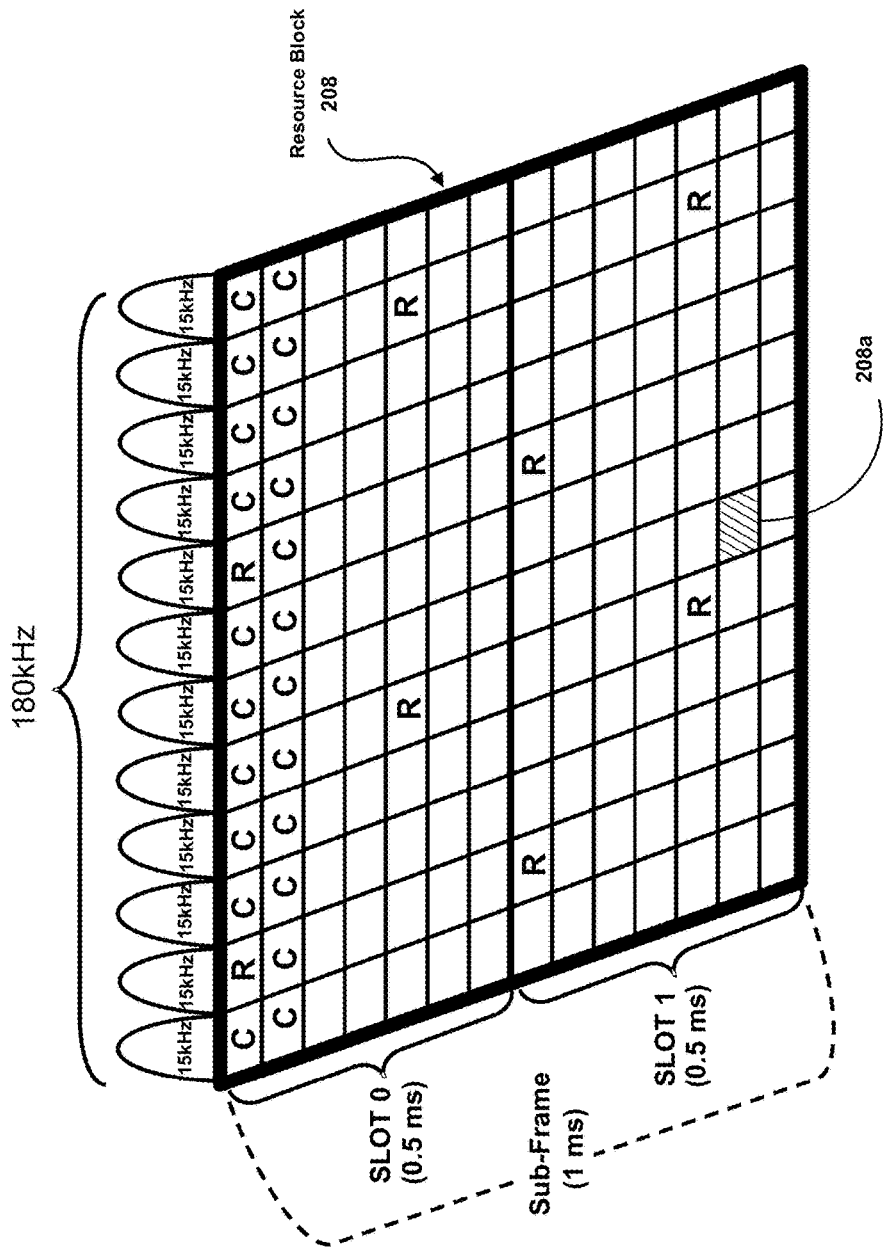
FIG. 2B is a conceptual illustration of a resource block, in accordance with example embodiments.

The use of different resource elements for different purpose is illustrated by way of example for a downlink resource block in FIG. 2B. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (including for instance the PDCCH). The other 138 resource elements that are unlabeled can be used to define the PDSCH for transmitting bearer data and other scheduled transmissions. It is to be understood that FIG. 2B illustrates only one possible configuration, and that a resource block could have other configurations as well.

Figure 3:
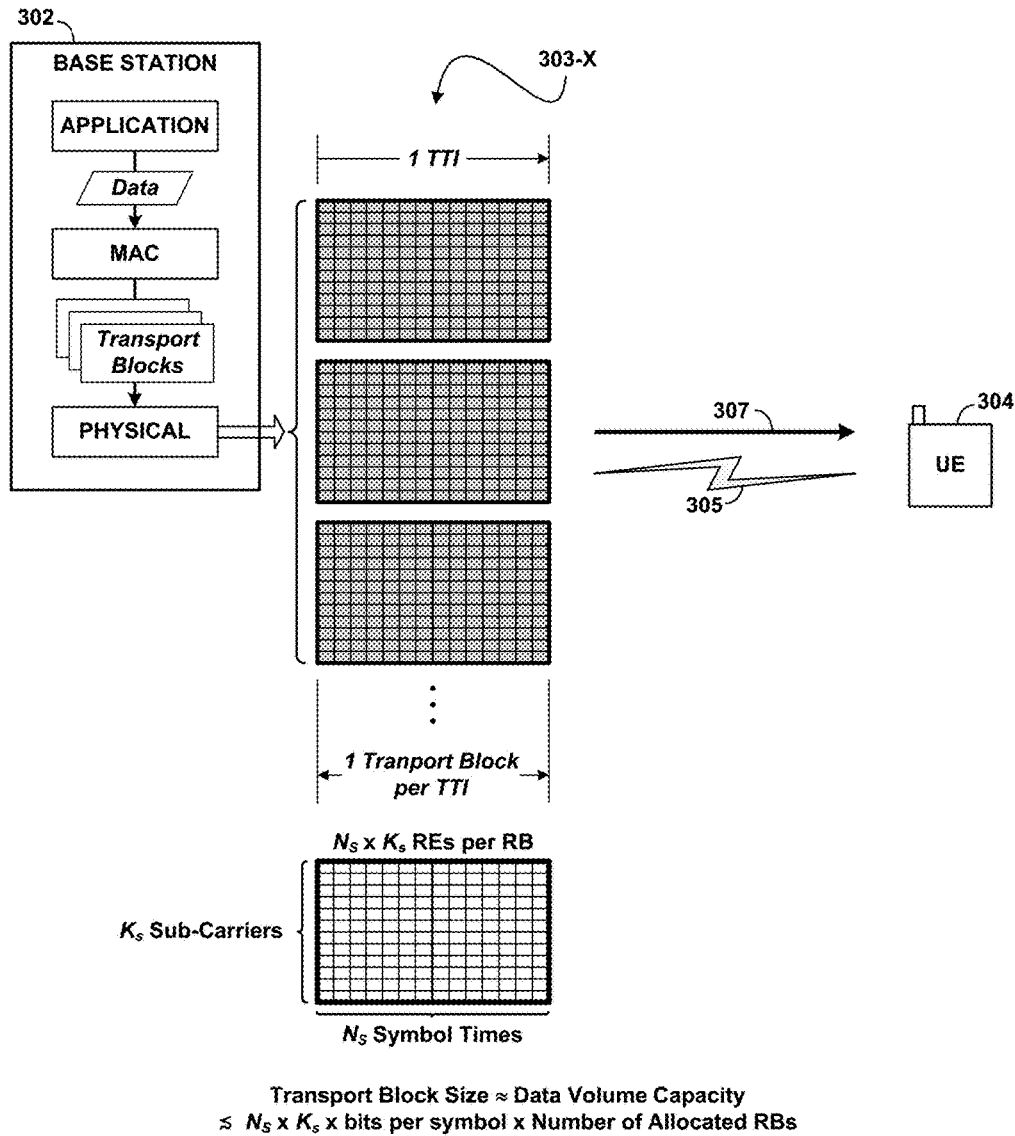
FIG. 3 is conceptual illustration of transport blocksize, in accordance with example embodiments.

The way in which a base station apportions or divides up data for downlink transmission can be understood by way of example by again considering LTE. FIG. 3 is a conceptual illustration of a relation between data apportioning and downlink resource blocks for an example case of downlink transmission. As shown by way of example, a base station 302 transmits data to a UE 304 on a downlink 307 supported on an air interface 305. A simplified high-level block diagram and data flow is depicted within the base station 302 in order to illustrate certain aspects of downlink transmission. A block labeled "Application" and representing an application layer process generates "Data" for transmission. The application could be a network-side support for a user application, such a video-chat program, and the data could be video and voice streaming data, for example. It will be appreciated, however, that the exact nature of the application and its data need not be specified for the current discussion. The data are presented to a medium access ("MAC") layer process for preparation for transmission by a physical layer labeled "Physical."

Among other possible processing steps, the MAC layer divides the data into Transport Blocks, each containing a volume of data for transmission during one TTI. Thus, the multiple transport blocks represented in FIG. 3 will each be transmitted during a different TTI. The transport block size (TBS) is determined so that the modulation encoded data will roughly completely "fill" each of one or more downlink resource blocks that are allocated for transmission during a TTI. Since each resource element of a resource block can carry one modulation data symbol, and each LTE resource block is made up of 168 resource elements, the transport block size, measured in bits, for a given TTI is approximately 168 multiplied by the number of bits per modulation data symbol and multiplied by the number of resource blocks allocated during the given TTI. This transport block size is approximate, because not every one of the 168 resource elements may necessarily be available to carry data. In addition, there may be other overhead factors that reduce the number of available resource elements. For purposes of the present discussion, the above approximation to the transport block size may be considered an upper limit, and can be represented mathematically by the symbol read "less than or approximately equal to."

In practice, an eNodeB, such the base station 302, will use a modulation coding scheme, or MCS, selected based on RF and/or signal-to-noise (S/N) conditions on the downlink air interface, as reported by the UE 304. Specifically, the UE sends a CQI on the uplink control channel to report its measurement of downlink channel quality. The modulation coding scheme then specifies the number of bits per modulation symbol. For example, for QPSK, each symbol encodes two bits; for 8PSK, each symbol encodes three bits; for 16QAM, each modulation data symbol encodes 4 bits; and for 64QAM, each modulation data symbol encodes 6 bits. Generally, the better the RF or S/N conditions, the "higher" the MCS (i.e., higher the bits per symbol).

As noted, the MCS for an upcoming (scheduled or requested) downlink transmission is typically determined by the base station according to observed conditions reported by the UE. The base station also typically determines how many uplink resource blocks, together with their corresponding sub-carrier groupings, to allocate during a given TTI. In operation, the base station may consult one or more tables that associate CQI with TBS with MCS and number of resource blocks. Such tables may be specified according to one or another LTE standard, for example. Thus, in the example illustrated in FIG. 3, the MAC apportions or subdivides the data from the application layer into transport-block-sized data "volumes."

At the physical layer, the base station applies the MCS to the data in units of one transport block per respective TTI to generate modulation data symbols, which are then transmitted by distributing them across respective grouping of sub-carriers of each allocated resource block, and generating a frequency superposition (OFDM symbol) at each symbol time across the respective TTI. With a transport block size determined according to LTE standards, modulated data are distributed across all $N_s$, =14 symbol times of a given resource block in a TTI. That is, each OFDM symbol carries actual modulated data.

In the example illustrated in FIG. 3, three resource blocks 303-X are allocated for downlink transmission during one TTI. Each is represented by an array or grid of resource elements, following a similar illustration of FIG. 2A. Each resource element is shaded in gray to represent that each carries a modulation data symbol (except for resource elements possibly used for overhead or other non-user-data purposes). An inset at the bottom of FIG. 3 indicates the sizing of the transport block. Namely, $N_s$ symbol times multiplied by $K_s$ sub-carriers, multiplied by bit per symbol, and multiplied by the number of resource blocks allocated during the TTI.

As noted above, an eNodeB typically uses a table look-up to select MCS and TBS for a transmission scheduled during a given TTI to a given UE. More specifically, the eNodeB maps the CQI reported by the given UE to a "MCS index" ("$I_{MCS}$") which in turn is an index into a table of modulation order values ("$Q_m$") and TBS indices. The modulation order is specifies the number of bits per symbol and the TBS index ("$I_{TBS}$") is an index into another table of TBS values for specified allocations of RBs per TTI. In practice, the eNodeB will allocate a given number of downlink RBs to the given UE for transmission during the given TTI. The eNodeB will then map the UE's reported CQI to $I_{MCS}$ and use $I_{MCS}$ to look up $Q_m$ and $I_{TBS}$, and use $I_{TBS}$ to look up the TBS for the given number of allocated downlink RBs.

Generally, the higher the CQI reported by a UE, the better the downlink channel quality that the UE is measuring. Higher CQI values also map to higher $I_{MCS}$, which in turn maps to higher MCS and larger TBS. Table 1 is an example of modulation and TBS table for LTE, reproduced from the standard "3GPP TS 36.213 V10.1.0" (release version 10).

TABLE 1

Table 7.1.7.1-1: Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Note that the caption "Table 1" beneath the table is the reference number used in the present disclosure, although is original title of the table includes "Table 7.1.7.1-1," which is the reference number used in the standard from which the table is reproduced.

In order to accommodate advances in UE receiver capabilities, the LTE standards, starting with release 12 added a second version of the modulation and TBS table, reproduced below in Table 2.

TABLE 2

Table 7.1.7.1-1A: Modulation and TBS index table 2 for PDSCH

| MCS Index $I_{MCS}$ | Modulation Order $Q_m$ | TBS Index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 4 | 16 |
| 11 | 6 | 17 |
| 12 | 6 | 18 |
| 13 | 6 | 19 |
| 14 | 6 | 20 |
| 15 | 6 | 21 |
| 16 | 6 | 22 |
| 17 | 6 | 23 |
| 18 | 6 | 24 |
| 19 | 6 | 25 |
| 20 | 8 | 26 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | reserved |
| 29 | 4 | |
| 30 | 6 | |
| 31 | 8 | |

Note that the caption "Table 2" beneath the table is the reference number used in the present disclosure, while is original title of the table is "Table 7.1.7.1-1A: Modulation and TBS index table 2 for PDSCH."

When determining a MCS and TBS for a downlink transmission, an eNodeB will consult the Rel 12 "index table 2" for a Rel 12 UE or later version, and will consult a pre-Rel 12 "index table" for a pre-Rel 12 UE. In practice, additional criteria apply to the use of the Rel 12 index table 2, making compliance of the UE with Rel 12 a necessary condition. The eNodeB may determine which release version(s) a UE is compliant with when the UE attaches to or registers with the network.

As can be seen, in the Rel 12 index table 2, the modulation order and $I_{TBS}$ both increase more rapidly with $I_{MCS}$ than in the pre-Rel 12 version of the index table. In addition, the modulation order values, $Q_m$, for the Rel 12 index table 2 goes up to 8, corresponding to 256-QAM and eight bits per symbol, while am of the pre-Rel 12 index table goes up only to 6, corresponding to 64-QAM and six bits per symbol. The operational result is that a Rel 12 UE will receive a higher downlink data rate than a pre-Rel 12 UE for the same reported CQI. Implementing two table versions thus generally enables more advanced UEs (e.g., those compliant with Rel 12 or later versions) to be served as higher data rates than earlier or older version UEs operating in the comparable conditions. At the same time, the procedures and protocols can maintain backward compatibility with earlier release versions.

The description above of how the receiving capabilities of different technology generations of UEs may be accommodated within a wireless network is illustrated in the context of LTE by way of example. It will be appreciated that there could be other, different procedures and protocols in place to similarly enable multi-generational (e.g., multi-release-version) UEs to operate according to their respective capabilities within a wireless network.

While taking advantage of enhanced receiving capabilities of later generation UEs in a wireless network as described enables higher downlink data rates, there may be circumstances in which a later generation UE would receive better service if it were to receive a lower downlink data rate. This could be the case, for example, if the downlink channel quality is not sufficient to support the higher data rates, even though the UE may be reporting CQI values that indicate otherwise. In particular, cellular wireless networks typically implement some form of transmission error detection and correction involving retransmission of all or part of failed transmissions. These techniques can entail subdividing a unit of transmission, such as a data packet, into smaller pieces or subpackets, adding information to each subpacket to enable a receiver to detect and possibly correct errors, transmitting the subpackets sequentially, and retransmitting some or all of the subpackets in response to retransmission requests from the receiver. In such a scheme, the frequency of retransmission requests can be an indicator of the quality of the channel on which the transmissions are made, since retransmission requests will be made upon failure to fully or successfully receive a subpacket. More particularly, a high frequency of retransmission requests and corresponding retransmissions can indicate that the channel quality is insufficient to support a data rate be used for the transmissions.

In the context of MCS and TBS selection in accordance (in part) with release version of a UE, and more generally, selection of downlink data speed in accordance (in part) with designated capabilities of a UE, the frequency of retransmission requests and corresponding retransmissions can be used to dynamically adapt selection protocols to better match real-time operating conditions. In keeping with the discussion and explanations above, example embodiments of dynamic adaptation of modulation and transport block size base of retransmission frequency may be described for LTE. A brief summary of retransmission procedures in LTE are first described, followed by a description of how they may be adapted in accordance with frequency of retransmissions.

In an LTE system, the base station and UE may engage in a hybrid automatic repeat request (HARQ) process to manage retransmission from the UE to the base station in the event of error. In a representative HARQ process, the UE may include with its transmission to the base station a cyclic redundancy check (CRC) that is computationally based on the transmitted data, and, upon receipt of the transmission, the base station may compute a CRC and determine whether it matches the CRC provided by the UE. If the CRC does not match (i.e., a CRC check fails) or if the base station otherwise determines that it has not completely received the data at issue (e.g., if the base station does not receive the scheduled transmission at all), the base station may then transmit to the UE on the air interface a HARQ negative acknowledgement (NACK), and the UE may then responsively retransmit the data to the base station. In a representative system, the UE may engage in this retransmission using the same air interfaces that the base station earlier allocated to the UE, but this time in a later TTI. On the other hand, if the CRC matches or the base station otherwise determines that it has completely received the data at issue, then the base station may transit to the UE a HARQ positive acknowledgement (ACK), which may let the UE know that the UE can proceed with a next data request/transmission rather than retransmitting.

An example HARQ process may also involve the base station including with its transmission to the UE some forward error correction (FEC) bits that the UE can use as a basis to uncover the transmitted data in the event of an error. With such an arrangement, if the UE detects that the CRC does not match, the UE may try to apply the FEC bits to uncover the data (e.g., to get the CRC to match) and, absent success, may then send a HARQ NACK to the base station to trigger retransmission. Further, the initial transmission and each retransmission by the base station to the UE may include the same bits of data and perhaps different FEC bits if any, or may include different portions of the data bits and perhaps different FEC bits if any, but may still be considered retransmission of the data. In practice, the UE may then work to complete its receipt of the base station's data transmission, perhaps by combining together the initial transmission with one or more retransmissions (e.g., to piece together the intended data transmission and/or to apply various FEC bits to uncover the intended data transmission), or by ultimately receiving a successful transmission of the data and having it replace one or more previously received erroneous transmissions. Other arrangements are possible as well.

Figure 4:
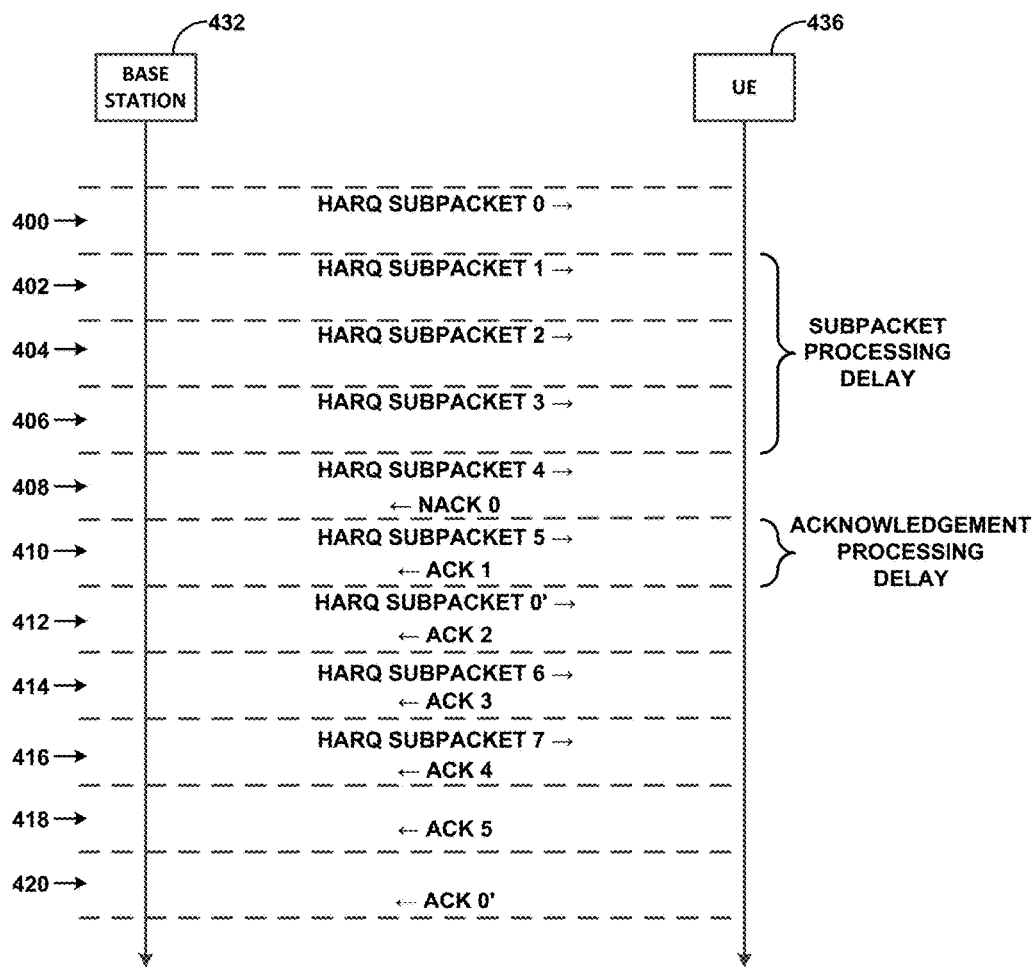
FIG. 4 illustrates an example of HARQ, in accordance with example embodiments.

FIG. 4 illustrates a series of HARQ transmissions between base station 432 and UE 436 in an FDD system. By way of example, a sequence of 11 TTI (subframes) 400-420 is depicted below the base station and UE, where time increases downward. In each of the TTIs 400-420, either or both base station 432 and UE 436 may transmit to one another, perhaps simultaneously, on different frequencies. For purposes of simplicity, it is assumed that base station 432 has eight HARQ subpackets queued to transmit to UE 436.

Starting in TTI 400, base station 432 begins transmitting the HARQ subpackets to UE 436. In TTI 400, base station 432 transmits HARQ subpacket 0. In TTI 402, base station 432 transmits HARQ subpacket 1. In TTI 404, base station 432 transmits HARQ subpacket 2. In TTI 406, base station 432 transmits HARQ subpacket 3.

As an example, it is assumed that UE 436 uses three subframes to process each HARQ subpacket. Thus, the first opportunity that UE 436 has to transmit a HARQ acknowledgment to base station 432 is TTI 408. In this TTI, UE 436 NACKs HARQ subpacket 0, indicating that UE 416 was unable to properly process or decode this subpacket. It is also assumed, for example, that base station 432 uses one full subframe to process each HARQ acknowledgment. Therefore, the earliest TTI in which base station 432 can respond to the NACK is TTI 412. In TTI 412, base station 432 transmits HARQ subpacket 0', which may be identical to HARQ subpacket 0. Alternatively, HARQ subpacket 0' may be different from HARQ subpacket 0', but derived from the same full packet as HARQ subpacket 0. For instance, HARQ subpacket 0 and HARQ subpacket 0' may have similar or the same payload bits, but different FEC bits. UE 436 also transmits a ACK for HARQ subpacket 2 in this TTI.

In the interim, base station 432 transmits HARQ subpacket 4 to UE 436 in TTI 408. Additionally, base station 432 transmits HARQ subpacket 5 to UE 436 in TTI 410, and UE 436 transmits a ACK of HARQ subpacket 1 also in TTI 410.

In TTIs 414 and 416, base station 432 transmits HARQ subpackets 6 and 7, respectively, and UE 436 transmits ACKs to HARQ subpackets 3 and 4, respectively. In TTIs 418 and 420, base station 432 does not transmit HARQ subpackets because it has transmitted all eight that it had queued for transmission. However, should any further NACKs be received from UE 436, base station 432 may retransmit the associated HARQ subpackets. Nonetheless, in TTIs 418 and 420, UE 436 transmits ACKs to HARQ subpackets 5 and 0', respectively.

The latter ACK indicates that UE 436 properly processed and decoded HARQ subpacket 0'. For instance, this ACK may indicate that UE 436 successfully combined the information that it received in HARQ subpacket 0 and HARQ subpacket 0' during TTIs 400 and 412. This ACK may also indicate that UE 436 was able to properly process and decode the full packet from which these subpackets were derived.

FIG. 4 depicts just one possible HARQ transmission scenario. Other scenarios may exist. In some of these scenarios, there may be more or fewer NACKs, and the general pattern of HARQ subpacket transmission and associated HARQ acknowledgments may vary. Thus, FIG. 4 should be considered illustrative and non-limiting.

For each transmission in FIG. 4, the base station 432 uses a MCS and TBS determined as described above. In particular, under LTE, the base station will use one of the two tables presented above in accordance with the version compliance of the UE (as well as other factors), such that a Rel 12 UE can receive higher transmission rates than a pre-Rel 12 UE for the same reported CQI. In a sequence of TTIs over which HARQ transmissions are made, the number of retransmission requests (and corresponding retransmissions) can be considered a "frequency" of retransmissions—e.g., how "often" retransmissions are requested and made. Since, as explained above, the frequency of retransmission request can be a real-time indicator of channel quality, a HARQ sequence that requires more than, for example, half of the allotted retransmission requests may be indicative of worse channel conditions than the reported CQI suggests. Yet, in conventional operation under LTE, if the Rel 12 index table 2 is used for determining MCS and TBS, then it will be used for all transmissions and retransmissions, regardless of the frequency of retransmissions. This effectively ignores signs that the channel quality may be insufficient to support the data rates derived from the Rel 12 index table 2. Example embodiments herein remedy this shortcoming of conventional operation. Thus, in accordance with example embodiments, if the number of retransmission requests exceeds a threshold number, the base station will revert to using the pre-Rel 12 index table for selecting MCS and TBS for the Rel 12 UE for further retransmissions.

Figure 5:
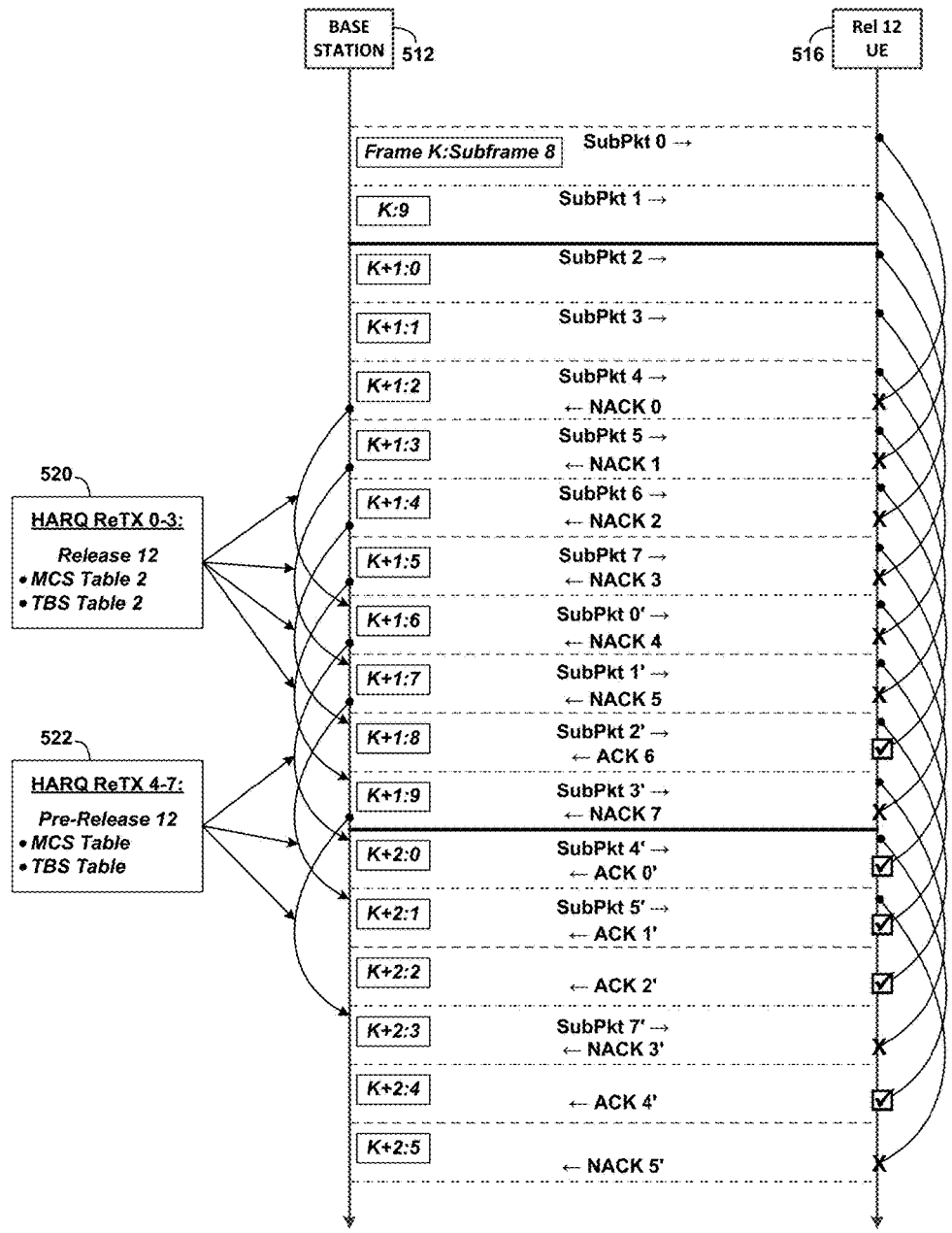
FIG. 5 illustrates an example of applying dynamic adjustment of modulation scheme and transport block size to HARQ, in accordance with example embodiments.

FIG. 5 illustrates an example of such dynamic adaptation of modulation and transport block size base of retransmission frequency, in accordance with example embodiments. For the illustrated example, it is assumed that an LTE system implements a form of HARQ referred to as 8-HARQ. In 8-HARQ, packets for transmission (or more generally, units of data) are subdivided into eight subpackets, and then transmitted sequentially in eight sequential TTIs. The receiving entity responds to each received subpacket with an ACK or NACK four subframes later, and the sending entity makes any necessary (requested) retransmissions four subframes after receiving a NACK. Thus, there can be up to N=8 retransmissions for a given packet transmission, and eight TTIs between a transmission and a requested retransmission. In accordance with example embodiments, a base station using Rel 12 index table 2 for a Rel 12 UE will switch to using the pre-Rel 12 index table after receiving M=4 retransmission requests and/or after sending M=4 retransmissions.

In FIG. 5, a base station 512 transmits a packet on a downlink air interface to a Rel 12 UE 516, as shown. By way of illustration, the time sequence in FIG. 5 includes the last two subframes of Frame K, a full frame (10 subframes) of Frame K+1, and the first six subframes of Frame K+2. The frames and subframes are labeled K:8, K:9, K+1:0, K+1:1, ..., K+1:9, K+2:0, K+2:1, ..., K+2:5. Thus, FIG. 5 shows a snapshot of frames and subframes in a larger continuum, as is evident from the labeling scheme.

On the vertical timeline beneath the Rel 12 UE 516, an arced line connects the subframe of each received HARQ subpacket with a subsequent subframe four TTIs later in which the UE sends either an ACK or a NACK. As a visual cue, each ACK is depicted as a "check box" and each NACK is depicted as an "X." Thus, for example, subpacket 0 is transmitted from the base station 512 to the Rel 12 UE 516 in K:8, and the UE sends "NACK 0" (indicated by an "X") in K+1:2. Similarly, and again by way of example, subpacket 1 is transmitted from the base station 512 to the Rel 12 UE 516 in K:9, and the UE sends "NACK 1" (indicated by an "X") in K+1:3. And so on. Note that the first successful subpacket transmission is (by way of example) subpacket 6, which is transmitted in K:9; in this case, the UE sends "ACK 6" (indicated by a checked box) in K+1:8.

On the vertical timeline beneath the base station 512, an arced arrow connects the subframe of each received HARQ NACK with a subsequent subframe four TTIs later in which the retransmits the request subpacket. Thus, for example, "NACK 0" is received in K+1:2, and the base station retransmits subpacket 0' in K+1:6. Similarly, "NACK 1" is received in K+1:3, and the base station retransmits subpacket 1' in K+1:7. And so on.

Since the UE 516 is compliant with Rel 12, the base station may use the Rel 12 index table 2 to determine MCS and TBS (e.g., subject to additional criteria specified in the Rel 12 standard). In accordance with example embodiments, if the Rel 12 index table 2 is being used, and a packet (or more generally, a unit of data transmitted using 8-HARQ) is not successfully received by a UE within the first four retransmission requests, then the base station will switch to using the pre-Rel 12 index table for the (up to) four remaining retransmission requests. This is indicated in the illustrated example of FIG. 5 by the boxes 520 and 522, which each specify which index table to use for which HARQ retransmissions. Specifically, box 520 specifies that the Rel 12 index table 2 should be used for HARQ retransmission request 0-3, while box 522 specifies that the pre-Rel 12 index table should be used for HARQ retransmissions 4-7.

In FIG. 5, four arrows point from box 520 to the retransmissions (arced arrows on the base station timeline) of subpackets 0, 1, 2, and 3. These retransmissions are carried out using the Rel 12 index table 2. In this example, three arrows point from box 523 to the retransmissions of subpackets 4, 5, and 7. For these retransmissions, the base station switched to using the pre-Rel 12 index table. Note that for this example, subpacket 6 did not require retransmission.

By switching to the pre-Rel 12 index table, the base station effectively reduced the data transmission rate in response to a real-time indication that the channel quality was not sufficient to support the higher rates of the Rel 12 index table 2. In accordance with example embodiments, the indication of this condition was the reception at the base station of the "NACK 4"—i.e., the evident requirement for more than four HARQ retransmissions. Reducing the data rate in this way may enable the remaining four HARQ retransmissions to be completed successfully.

In accordance with example embodiments, the base station may keep a running tally of HARQ retransmissions for a particular packet transmission to a given UE. If the base station is using the Rel 12 index table 2 for the given UE, then once the tally reaches or exceeds four, the base station will switch to the pre-Rel index table. It will be appreciated that other number besides four can be used as a threshold for switching from the Rel 12 index table 2 to the pre-Rel index table. In addition, example embodiments can be extended to other HARQ schemes besides 8-HARQ, and to other retransmission schemes besides HARQ. The techniques described by way of example above can also be further generalized to apply to other types of transmission rate determination besides index tables, and even MCS and TBS. For example, a threshold number of retransmission requests can be applied to other forms of data rate reduction.

Further, while the example embodiments above have been described in terms of differentiating between different versions of LTE standards as a basis for determining how to select downlink data rates for UEs, there could be other differentiating factors or criteria. In a general sense, differentiating between release versions of standards could be adapted to identifying UEs as belonging to different classes, where the classes designate UE capabilities, such as different downlink data rates supported for like channel conditions.

Figure 6:
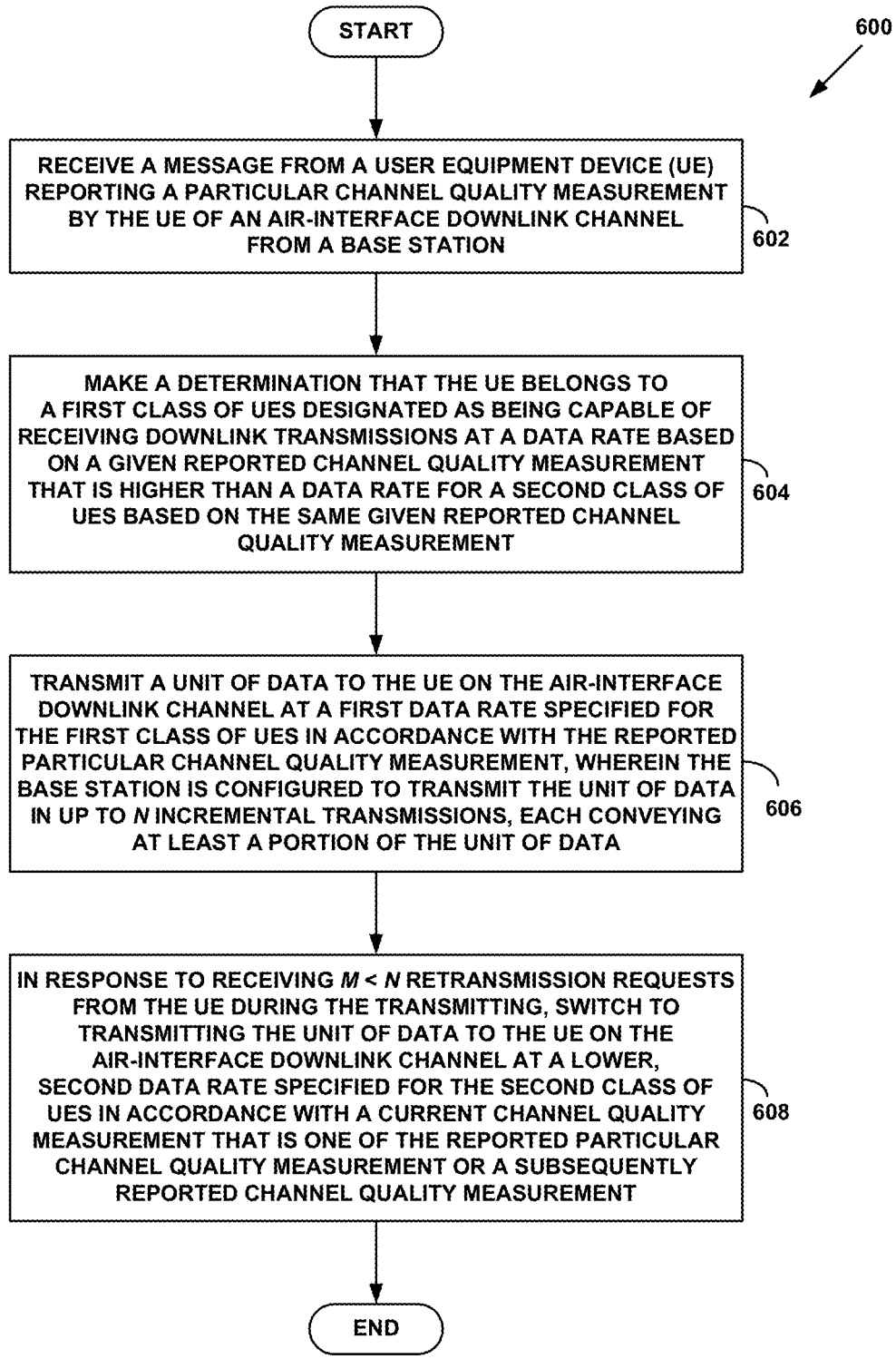
FIG. 6 is a flowchart illustrating an example method for dynamic adjustment of modulation scheme and transport block size based on retransmission frequency, in accordance with example embodiments.

Turning now to an example method, FIG. 6 is a flowchart illustrating method 600, according to example embodiments. Example methods, such as method 600, may be carried out in whole or in part a wireless communication network by one or more base stations and/or other components, such as by the eNodeB 112 of the representative LTE RAN 100 shown in FIG. 1, using one or more of the air interface arrangements shown in FIGS. 2A-2B. It should be understood that example methods, such as method 600, may be carried out by other entities or combinations of entities as well as in other arrangements, without departing from the scope of the invention. By way of example, the method 600 can be implemented as machine language instructions that can be stored on non-transient machine-readable media (e.g, solid state memory, magnetic disk, etc), and that when executed by one or more processors of a base station to cause the base station to carry out operations, steps, and/or functions of the method.

In example embodiments, method 600 may operable in a base station of a wireless communication network, where the base station configured for serving user equipment devices (UEs).

As shown by block 602 in FIG. 6, method 600 involves the base station receiving a message from a UE reporting a particular channel quality measurement by the UE of an air-interface downlink channel from the base station.

As shown by block 604 in FIG. 6, method 600 next involves the base station making a determination that the UE belongs to a first class of UEs, where UEs of the first class are designated as being capable of receiving downlink transmissions at a data rate based on a given reported channel quality measurement that is higher than a data rate for a second class of UEs based on the same given reported channel quality measurement. That is, given the same channel quality measurement reported by a UE of the first class and a UE of the second class, the UE of the first class would be capable of receiving data at a higher rate than the UE of the second class. In accordance with example embodiments, the base station could determine that the UE belongs to the first class of UEs by identifying the UE as a member of the first class of UEs according to an identifier provided by the UE, for example when the UE registers with wireless network.

As shown by block 606 in FIG. 6, method 600 next involves the base station transmitting a unit of data to the UE on the air-interface downlink channel at a first data rate specified for the first class of UEs in accordance with the reported particular channel quality measurement, where the base station is configured to transmit the unit of data in up to N incremental transmissions, each conveying at least a portion of the unit of data.

Finally, as shown by block 608, method 600 involves the base station, in response to receiving M retransmission requests from the UE during the transmitting, where M<N, switching to transmitting the unit of data to the UE on the air-interface downlink channel at a lower, second data rate specified for the second class of UEs in accordance with a current channel quality measurement. In this case, the current channel quality measurement could be the reported particular channel quality measurement, or a subsequently reported channel quality measurement.

In accordance with example embodiments, transmitting the unit of data to the UE at the first data rate specified for the first class of UEs in accordance with the reported particular channel quality measurement could entail modulating and encoding the data unit using a modulating and encoding scheme (MCS) selected from a first plurality of MCSs based on the reported particular channel quality measurement. Transmission at the first data rate could further entail assembling the modulated and encoded data unit into one or more transport blocks, each of a transport block size (TBS) selected from a first plurality of TBSs based on the reported particular channel quality measurement, and then transmitting the one or more transport blocks to the UE on the air-interface downlink channel.

In further accordance with accordance with example embodiments, transmitting the unit of data to the UE at the lower, second data rate specified for the second class of UEs in accordance with the current channel quality measurement could entail modulating and encoding at least a portion of the data unit using a MCS selected from a second plurality of MCSs based on the current channel quality measurement, where the at least a portion of the data unit is a portion that the UE has failed to receive in M of N transmissions corresponding to the M received retransmission requests. Transmission at the second rate could further entail assembling the modulated and encoded at least a portion of the data unit into one or more alternatively-sized transport blocks, where each alternative TBS is selected from a second plurality of TBSs based on the current channel quality measurement, and then transmitting the one or more alternatively-sized transport blocks to the UE on the air-interface downlink channel in up to N−M incremental retransmissions.

In accordance with example embodiments a system configured to operate under at least LTE, transmitting the unit of data to the UE at the first data rate specified for the first class of UEs in accordance with the reported particular channel quality measurement could entail making at least M of N incremental transmissions and up to M incremental retransmissions according to a hybrid automatic repeat request (HARM) protocol, using the first data rate. Further, transmitting the unit of data to the UE at the lower, second data rate specified for the second class of UEs in accordance with the current channel quality measurement could entail making up to N–M incremental retransmissions according to the HARQ protocol, using the second data rate.

Also in accordance with example embodiments a system configured to operate under at least LTE, the wireless communication network could operated according to Release Version 12 (Rel 12) of LTE or a later release version of LTE. Then, receiving the message from the UE could entail receiving a particular Channel Quality Indicator (CQI) reported from the UE; the current channel quality measurement could be a current CQI, where current CQI is the particular CQI or a subsequently reported CQI. Further, making the determination that the UE belongs to a first class of UEs could entail identifying the UE as one compliant with Rel 12 or a later release version of LTE. With this arrangement, transmitting the unit of data to the UE at the first data rate specified for the first class of UEs in accordance with the reported particular channel quality measurement could entail making at least M of N incremental transmissions and up to M incremental retransmissions according to a hybrid automatic repeat request (HARQ) protocol, using a modulating and encoding scheme (MCS) and transport block size (TBS) selected, based on the particular CQI, from a table specified for Rel 12 or later release version of LTE. Further still, transmitting the unit of data to the UE at the lower, second data rate specified for the second class of UEs in accordance with the current channel quality measurement could making up to N–M incremental retransmissions according to the HARQ protocol, using a MCS and TBS selected, based on the current CQI, from a table specified for a release version of LTE earlier than Rel 12.

In an example embodiment under LTE, N could be 8 and M could be 4.

It will be appreciated that the example method 600 could each include alternate and/or additional steps, while still remaining within the scope and spirit of example embodiments herein.

Figure 7:
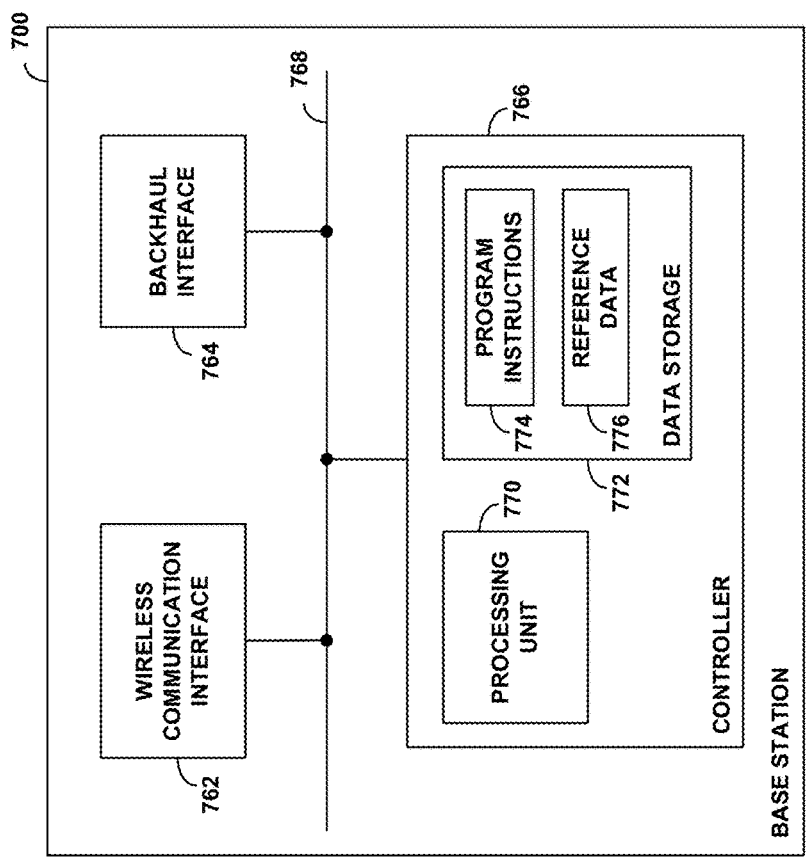
FIG. 7 is a simplified block diagram of an example base station, in accordance with example embodiments.

FIG. 7 is next a simplified block diagram of a base station 700 (such as the eNodeB 112 in FIG. 1), showing some of the components that such an entity could include in accordance with an example implementation. In particular, the example base station could configured to to dynamically adjust modulation scheme and block size based on retransmission frequency, as well as other operations described above.

As shown in FIG. 7, the example base station includes a wireless communication interface 762, a backhaul interface 764, and a controller 766, all of which could be coupled together or otherwise interconnected by a system bus, network, or other connection mechanism 768. Further, these or other components of the base station could be integrated together in various ways.

In the example base station, the wireless communication interface 762 could be configured to engage in wireless communication with UE via an air interface between the base station and the UE. As such, the wireless communication interface could include a radio compliant with the protocol that the base station will use for communication with the UE station, such as LTE for instance, and could further include an OFDM transceiver and an antenna structure for transmitting on a downlink and receiving on an uplink of the air interface. The backhaul interface 764 may then be a wired or wireless interface for communicating with various core network entities, such as with an SGW and MME as discussed above for instance.

The controller 766, in turn, could be configured to control operation of the base station including implementing various base station operations described herein, such as to dynamically adjusting modulation scheme and block size based on retransmission frequency, as described above.

As shown by way of example, the controller 766 could include a processing unit 770 and data storage 772. Processing unit 770 could comprise one or more general purpose processors (e.g., microprocessors) and/or one or more special-purpose processors (e.g., application specific integrated circuits or digital signal processors). And data storage 772 could comprise one or more non-transitory volatile and/or non-volatile storage components, such as magnetic, optical, or flash memory, and could hold or be encoded with program instructions 774 and reference data 776. Program instructions 774 could be executable by processing unit 770 to carry out various base station operations described herein. And reference data 776 could include various data to facilitate carrying out the operations, such as those described above.

Exemplary embodiments have been described above. Those skilled in the art will understand, however, that changes and modifications may be made to these embodiments without departing from the true scope and spirit of the invention.

We claim:

1. A method operable in a base station of a wireless communication network, the method comprising:
receiving a message from a user equipment device (UE) reporting a particular channel quality measurement by the UE of an air-interface downlink channel from the base station;
making a determination that the UE belongs to a first class of UEs designated as being capable of receiving downlink transmissions at a data rate based on a given reported channel quality measurement that is higher than a data rate for a second class of UEs based on the same given reported channel quality measurement;
transmitting a unit of data to the UE on the air-interface downlink channel at a first data rate specified for the first class of UEs in accordance with the reported particular channel quality measurement, wherein the base station is configured to transmit the unit of data in up to N incremental transmissions, each conveying at least a portion of the unit of data; and
in response to receiving M retransmission requests from the UE during the transmitting, wherein M<N, switching to transmitting the unit of data to the UE on the air-interface downlink channel at a lower, second data rate specified for the second class of UEs in accordance with a current channel quality measurement, the current channel quality measurement being one of the reported particular channel quality measurement or a subsequently reported channel quality measurement.

2. The method of claim 1, wherein making the determination that the UE belongs to the first class of UEs comprises identifying the UE as a member of the first class of UEs according to an identifier provided by the UE.

3. The method of claim 1, wherein transmitting the unit of data to the UE on the air-interface downlink channel at the first data rate specified for the first class of UEs in accordance with the reported particular channel quality measurement comprises:
modulating and encoding the data unit using a modulating and encoding scheme (MCS) selected from a first plurality of MCSs based on the reported particular channel quality measurement;
assembling the modulated and encoded data unit into one or more transport blocks, each of a transport block size (TBS) selected from a first plurality of TBSs based on the reported particular channel quality measurement; and transmitting the one or more transport blocks to the UE on the air-interface downlink channel.

4. The method of claim 3, wherein transmitting the unit of data to the UE on the air-interface downlink channel at the lower, second data rate specified for the second class of UEs in accordance with the current channel quality measurement comprises:

modulating and encoding at least a portion of the data unit using a MCS selected from a second plurality of MCSs based on the current channel quality measurement, the at least a portion of the data unit being at least that which the UE has failed to receive in M of N transmissions corresponding to the M received retransmission requests;

assembling the modulated and encoded at least a portion of the data unit into one or more alternatively-sized transport blocks, each of a TBS selected from a second plurality of TBSs based on the current channel quality measurement; and transmitting the one or more alternatively-sized transport blocks to the UE on the air-interface downlink channel in up to N−M incremental retransmissions.

5. The method of claim 1, wherein transmitting the unit of data to the UE on the air-interface downlink channel at the first data rate specified for the first class of UEs in accordance with the reported particular channel quality measurement comprises making at least M of N incremental transmissions and up to M incremental retransmissions according to a hybrid automatic repeat request (HARQ) protocol, using the first data rate.

6. The method of claim 5, wherein transmitting the unit of data to the UE on the air-interface downlink channel at the lower, second data rate specified for the second class of UEs in accordance with the current channel quality measurement comprises making up to N−M incremental retransmissions according to the HARQ protocol, using the second data rate.

7. The method of claim 1, wherein the wireless communication network operates according to Release Version 12 (Rel 12) of LTE or a later release version of LTE, wherein receiving the message from the UE comprises receiving a particular Channel Quality Indicator (CQI) reported from the UE, and the current channel quality measurement is a current CQI, the current CQI being one of the particular CQI or a subsequently reported CQI, wherein making the determination that the UE belongs to a first class of UEs comprises identifying the UE as one compliant with Rel 12 or a later release version of LTE, wherein transmitting the unit of data to the UE on the air-interface downlink channel at the first data rate specified for the first class of UEs in accordance with the reported particular channel quality measurement comprises making at least M of N incremental transmissions and up to M incremental retransmissions according to a hybrid automatic repeat request (HARQ) protocol, using a modulating and encoding scheme (MCS) and transport block size (TBS) selected, based on the particular CQI, from a table specified for Rel 12 or later release version of LTE, and wherein transmitting the unit of data to the UE on the air-interface downlink channel at the lower, second data rate specified for the second class of UEs in accordance with the current channel quality measurement comprises making up to N−M incremental retransmissions according to the HARQ protocol, using a MCS and TBS selected, based on the current CQI, from a table specified for a release version of LTE earlier than Rel 12.

8. The method of claim 7, wherein N=8 and M=4.

9. A base station of a wireless communication network, the base station comprising:

a first transceiver;

one or more processors; and memory accessible to the one or more processors, and storing machine language instructions that, upon execution by the one or more processors, cause the base station to carry out operations including:

receiving a message from a user equipment device (UE) reporting a particular channel quality measurement by the UE of an air-interface downlink channel from the base station;

making a determination that the UE belongs to a first class of UEs designated as being capable of receiving downlink transmissions at a data rate based on a given reported channel quality measurement that is higher than a data rate for a second class of UEs based on the same given reported channel quality measurement;

transmitting a unit of data to the UE on the air-interface downlink channel at a first data rate specified for the first class of UEs in accordance with the reported particular channel quality measurement, wherein the base station is configured to transmit the unit of data in up to N incremental transmissions, each conveying at least a portion of the unit of data; and in response to receiving M retransmission requests from the UE during the transmitting, wherein M<1V, switching to transmitting the unit of data to the UE on the air-interface downlink channel at a lower, second data rate specified for the second class of UEs in accordance with a current channel quality measurement, the current channel quality measurement being one of the reported particular channel quality measurement or a subsequently reported channel quality measurement.

10. The base station of claim 9, wherein making the determination that the UE belongs to the first class of UEs comprises identifying the UE as a member of the first class of UEs according to an identifier provided by the UE.

11. The base station of claim 9, wherein transmitting the unit of data to the UE on the air-interface downlink channel at the first data rate specified for the first class of UEs in accordance with the reported particular channel quality measurement comprises:

modulating and encoding the data unit using a modulating and encoding scheme (MCS) selected from a first plurality of MCSs based on the reported particular channel quality measurement;

assembling the modulated and encoded data unit into one or more transport blocks, each of a transport block size (TBS) selected from a first plurality of TBSs based on the reported particular channel quality measurement; and transmitting the one or more transport blocks to the UE on the air-interface downlink channel.

12. The base station of claim 11, wherein transmitting the unit of data to the UE on the air-interface downlink channel at the lower, second data rate specified for the second class of UEs in accordance with the current channel quality measurement comprises:

modulating and encoding at least a portion of the data unit using a MCS selected from a second plurality of MCSs based on the current channel quality measurement, the at least a portion of the data unit being at least that which the UE has failed to receive in M of N transmissions corresponding to the M received retransmission requests;

assembling the modulated and encoded at least a portion of the data unit into one or more alternatively-sized transport blocks, each of a TBS selected from a second plurality of TBSs based on the current channel quality measurement; and transmitting the one or more alternatively-sized transport blocks to the UE on the air-interface downlink channel in up to N−M incremental retransmissions.

13. The base station of claim 9, wherein transmitting the unit of data to the UE on the air-interface downlink channel at the first data rate specified for the first class of UEs in accordance with the reported particular channel quality measurement comprises making at least M of N incremental transmissions and up to M incremental retransmissions according to a hybrid automatic repeat request (HARQ) protocol, using the first data rate, and wherein transmitting the unit of data to the UE on the air-interface downlink channel at the lower, second data rate specified for the second class of UEs in accordance with the current channel quality measurement comprises making up to N−M incremental retransmissions according to the HARQ protocol, using the second data rate.

14. The base station of claim 9, wherein the wireless communication network operates according to Release Version 12 (Rel 12) of LTE or a later release version of LTE, wherein receiving the message from the UE comprises receiving a particular Channel Quality Indicator (CQI) reported from the UE, and the current channel quality measurement is a current CQI, the current CQI being one of the particular CQI or a subsequently reported CQI, wherein making the determination that the UE belongs to a first class of UEs comprises identifying the UE as one compliant with Rel 12 or a later release version of LTE, wherein transmitting the unit of data to the UE on the air-interface downlink channel at the first data rate specified for the first class of UEs in accordance with the reported particular channel quality measurement comprises making at least M of N incremental transmissions and up to M incremental retransmissions according to a hybrid automatic repeat request (HARQ) protocol, using a modulating and encoding scheme (MCS) and transport block size (TBS) selected, based on the particular CQI, from a table specified for Rel 12 or later release version of LTE, and wherein transmitting the unit of data to the UE on the air-interface downlink channel at the lower, second data rate specified for the second class of UEs in accordance with the current channel quality measurement comprises making up to N−M incremental retransmissions according to the HARQ protocol, using a MCS and TBS selected, based on the current CQI, from a table specified for a release version of LTE earlier than Rel 12.

15. A non-transitory computer-readable medium having instructions stored there on that, when executed by one or more processors of a base station of a wireless communication network, cause the base station to carry out operations including:

receiving a message from a user equipment device (UE) reporting a particular channel quality measurement by the UE of an air-interface downlink channel from the base station;

making a determination that the UE belongs to a first class of UEs designated as being capable of receiving downlink transmissions at a data rate based on a given reported channel quality measurement that is higher than a data rate for a second class of UEs based on the same given reported channel quality measurement;

transmitting a unit of data to the UE on the air-interface downlink channel at a first data rate specified for the first class of UEs in accordance with the reported particular channel quality measurement, wherein the base station is configured to transmit the unit of data in up to N incremental transmissions, each conveying at least a portion of the unit of data; and in response to receiving M retransmission requests from the UE during the transmitting, wherein M<N, switching to transmitting the unit of data to the UE on the air-interface downlink channel at a lower, second data rate specified for the second class of UEs in accordance with a current channel quality measurement, the current channel quality measurement being one of the reported particular channel quality measurement or a subsequently reported channel quality measurement.

16. The non-transitory computer-readable of claim 15, wherein making the determination that the UE belongs to the first class of UEs comprises identifying the UE as a member of the first class of UEs according to an identifier provided by the UE.

17. The non-transitory computer-readable of claim 15, wherein transmitting the unit of data to the UE on the air-interface downlink channel at the first data rate specified for the first class of UEs in accordance with the reported particular channel quality measurement comprises:

modulating and encoding the data unit using a modulating and encoding scheme (MCS) selected from a first plurality of MCSs based on the reported particular channel quality measurement;

assembling the modulated and encoded data unit into one or more transport blocks, each of a transport block size (TBS) selected from a first plurality of TBSs based on the reported particular channel quality measurement; and transmitting the one or more transport blocks to the UE on the air-interface downlink channel.

18. The non-transitory computer-readable of claim 17, wherein transmitting the unit of data to the UE on the air-interface downlink channel at the lower, second data rate specified for the second class of UEs in accordance with the current channel quality measurement comprises:

modulating and encoding at least a portion of the data unit using a MCS selected from a second plurality of MCSs based on the current channel quality measurement, the at least a portion of the data unit being at least that which the UE has failed to receive in M of N transmissions corresponding to the M received retransmission requests;

assembling the modulated and encoded at least a portion of the data unit into one or more alternatively-sized transport blocks, each of a TBS selected from a second plurality of TBSs based on the current channel quality measurement; and transmitting the one or more alternatively-sized transport blocks to the UE on the air-interface downlink channel in up to N−M incremental retransmissions.

19. The non-transitory computer-readable of claim 15, wherein transmitting the unit of data to the UE on the air-interface downlink channel at the first data rate specified for the first class of UEs in accordance with the reported particular channel quality measurement comprises making at least M of N incremental transmissions and up to M incremental retransmissions according to a hybrid automatic repeat request (HARQ) protocol, using the first data rate, and wherein transmitting the unit of data to the UE on the air-interface downlink channel at the lower, second data rate specified for the second class of UEs in accordance with the current channel quality measurement comprises making up to N−M incremental retransmissions according to the HARQ protocol, using the second data rate.

20. The non-transitory computer-readable of claim 15, wherein the wireless communication network operates according to Release Version 12 (Rel 12) of LTE or a later release version of LTE, wherein receiving the message from the UE comprises receiving a particular Channel Quality Indicator (CQI) reported from the UE, and the current channel quality measurement is a current CQI, the current CQI being one of the particular CQI or a subsequently reported CQI, wherein making the determination that the UE belongs to a first class of UEs comprises identifying the UE as one compliant with Rel 12 or a later release version of LTE, wherein transmitting the unit of data to the UE on the air-interface downlink channel at the first data rate specified for the first class of UEs in accordance with the reported particular channel quality measurement comprises making at least M of N incremental transmissions and up to M incremental retransmissions according to a hybrid automatic repeat request (HARQ) protocol, using a modulating and encoding scheme (MCS) and transport block size (TBS) selected, based on the particular CQI, from a table specified for Rel 12 or later release version of LTE, and wherein transmitting the unit of data to the UE on the air-interface downlink channel at the lower, second data rate specified for the second class of UEs in accordance with the current channel quality measurement comprises making up to N−M incremental retransmissions according to the HARQ protocol, using a MCS and TBS selected, based on the current CQI, from a table specified for a release version of LTE earlier than Rel 12.

\* \* \* \* \*